Sept. 1, 1964  J. R. JOHNSON  3,146,704
DECORATING ON BOTTLES AND THE LIKE
Filed Sept. 26, 1962  9 Sheets-Sheet 1
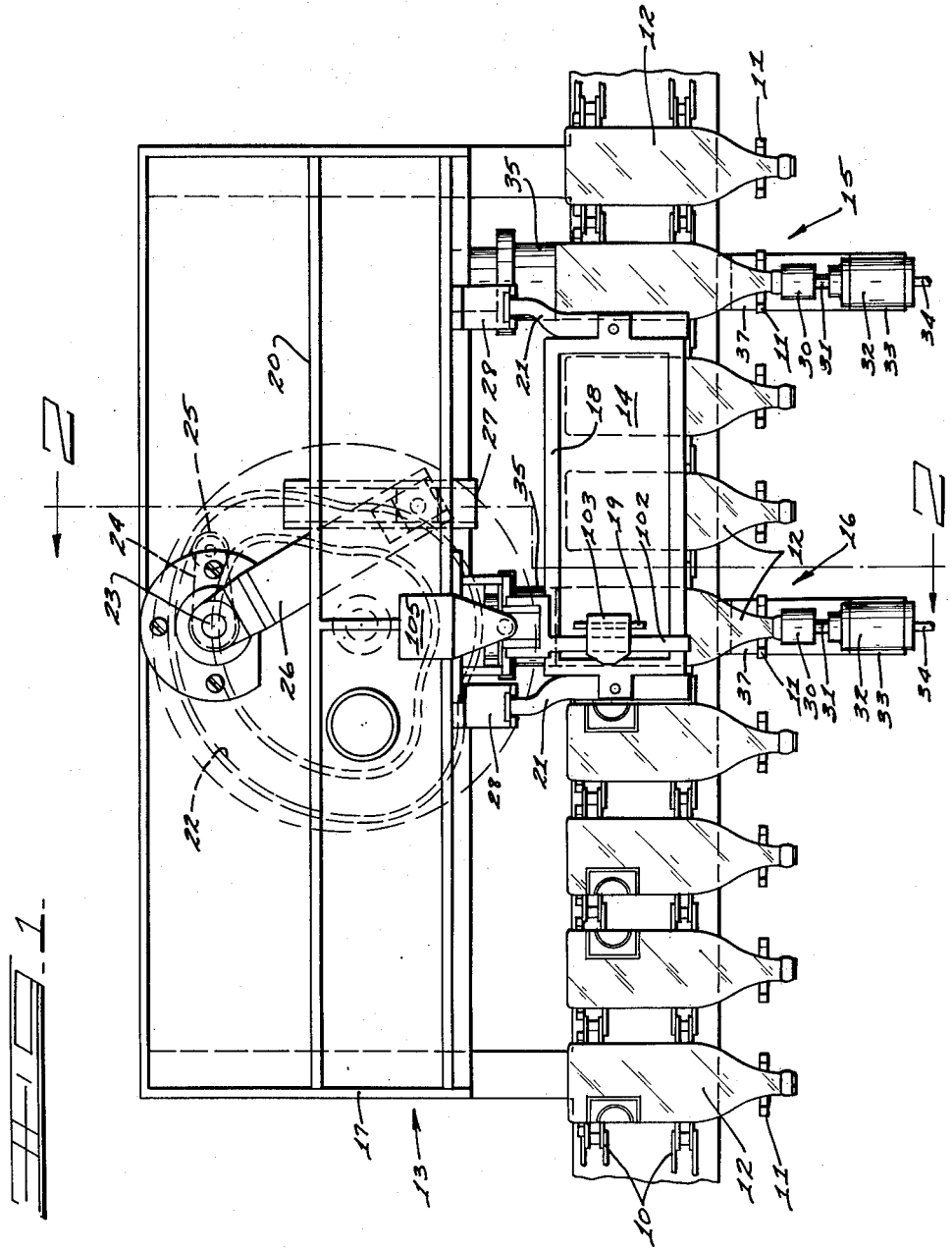
INVENTOR.
JOHN R. JOHNSON
BY
J. R. Nelson
and W. A. Schaich
ATTORNEYS

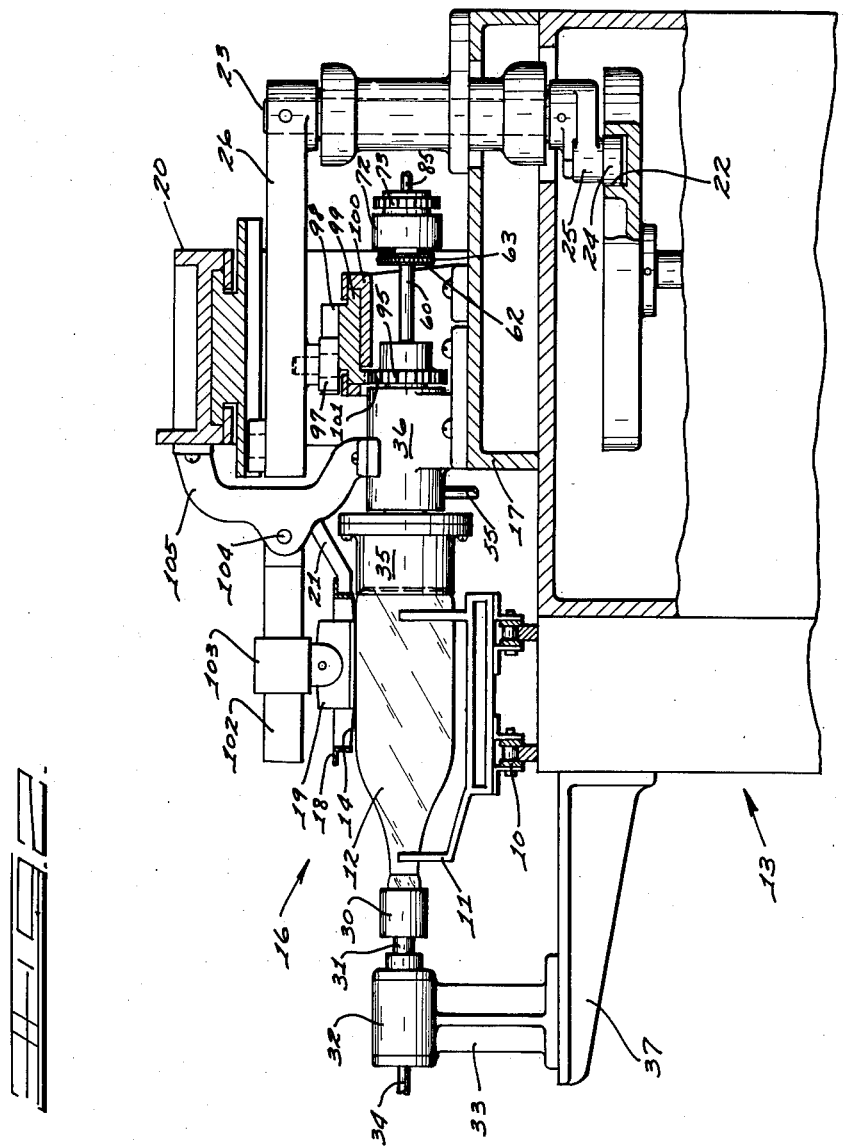

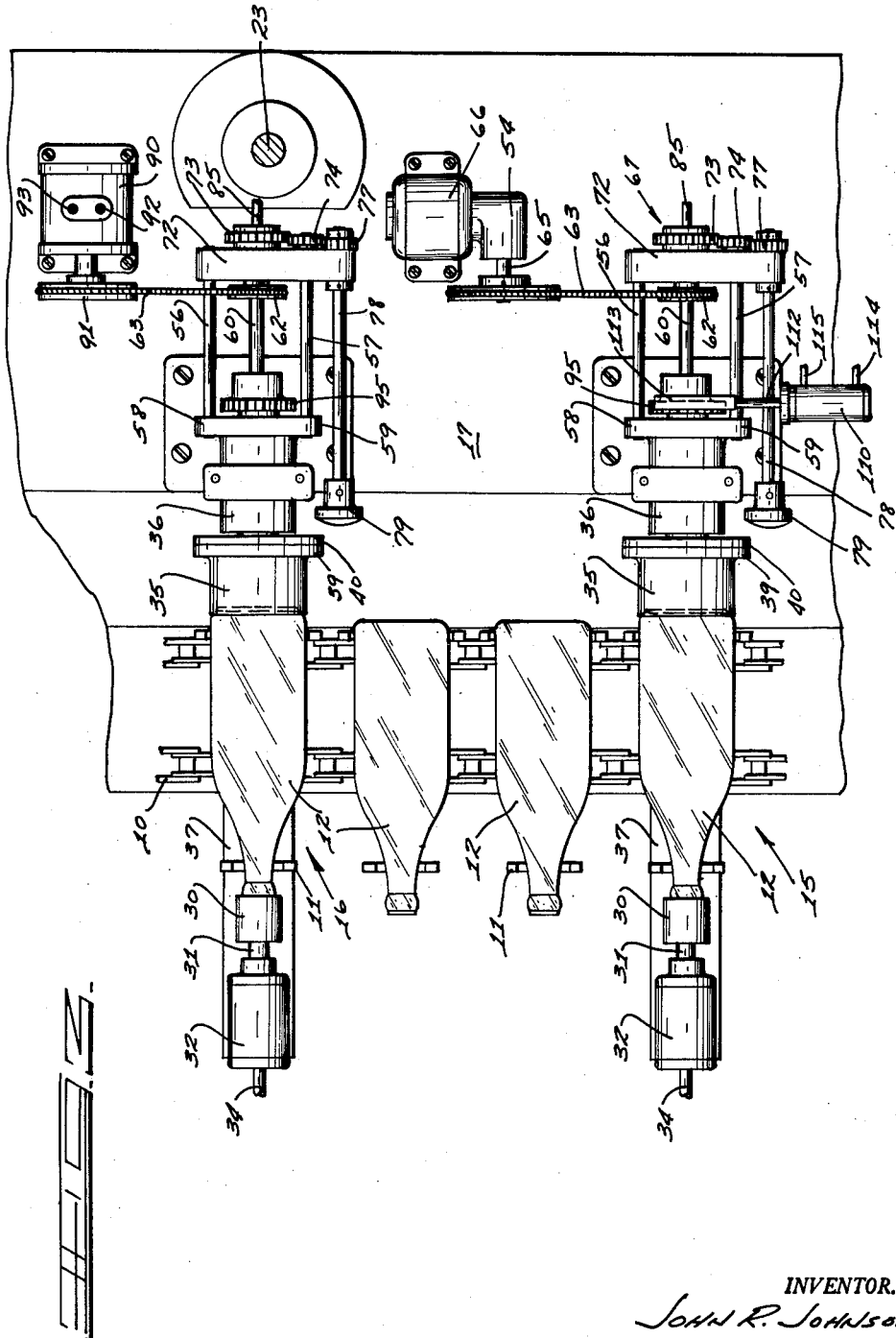

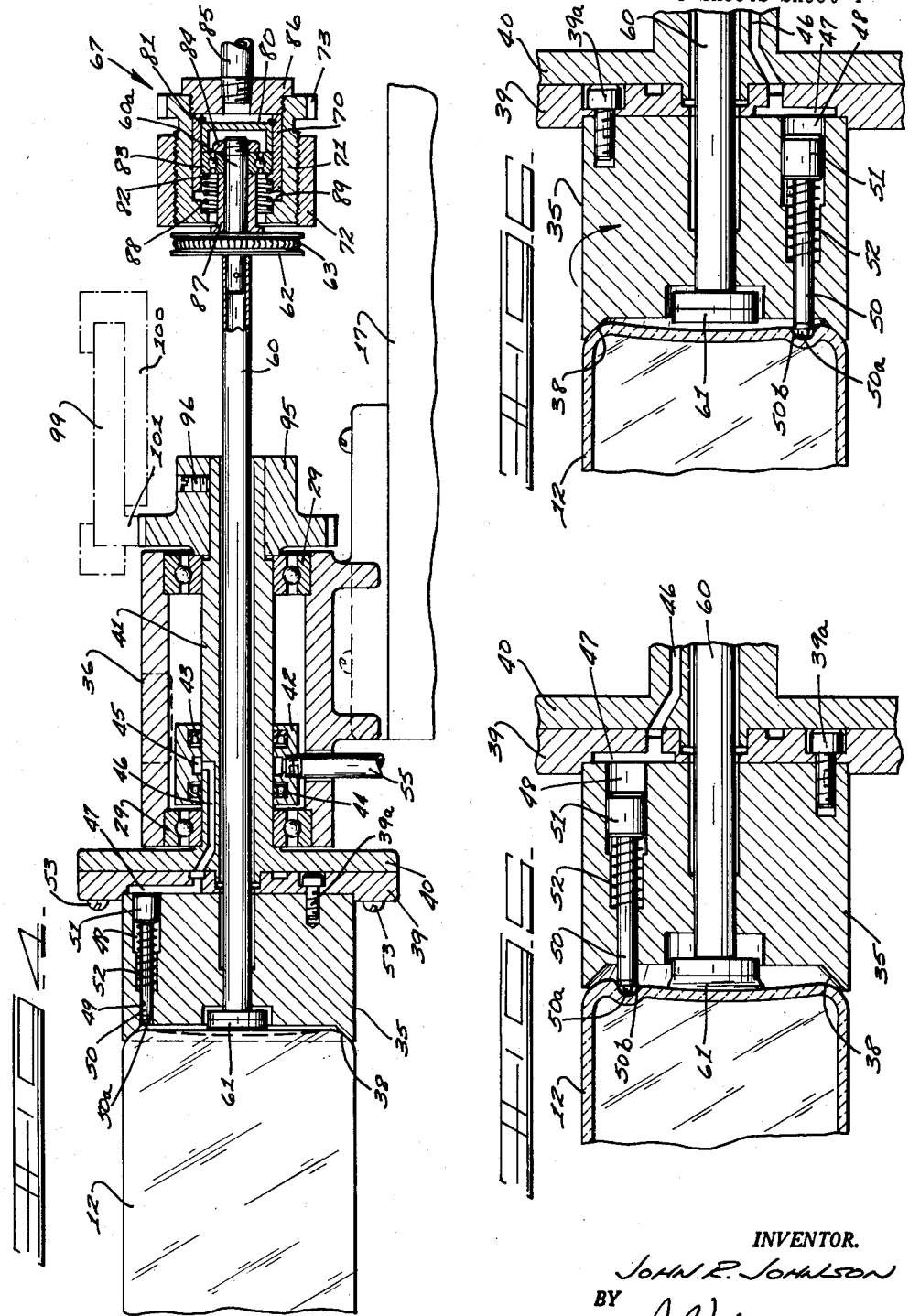

Sept. 1, 1964 J. R. JOHNSON 3,146,704
DECORATING ON BOTTLES AND THE LIKE
Filed Sept. 26, 1962 9 Sheets-Sheet 5
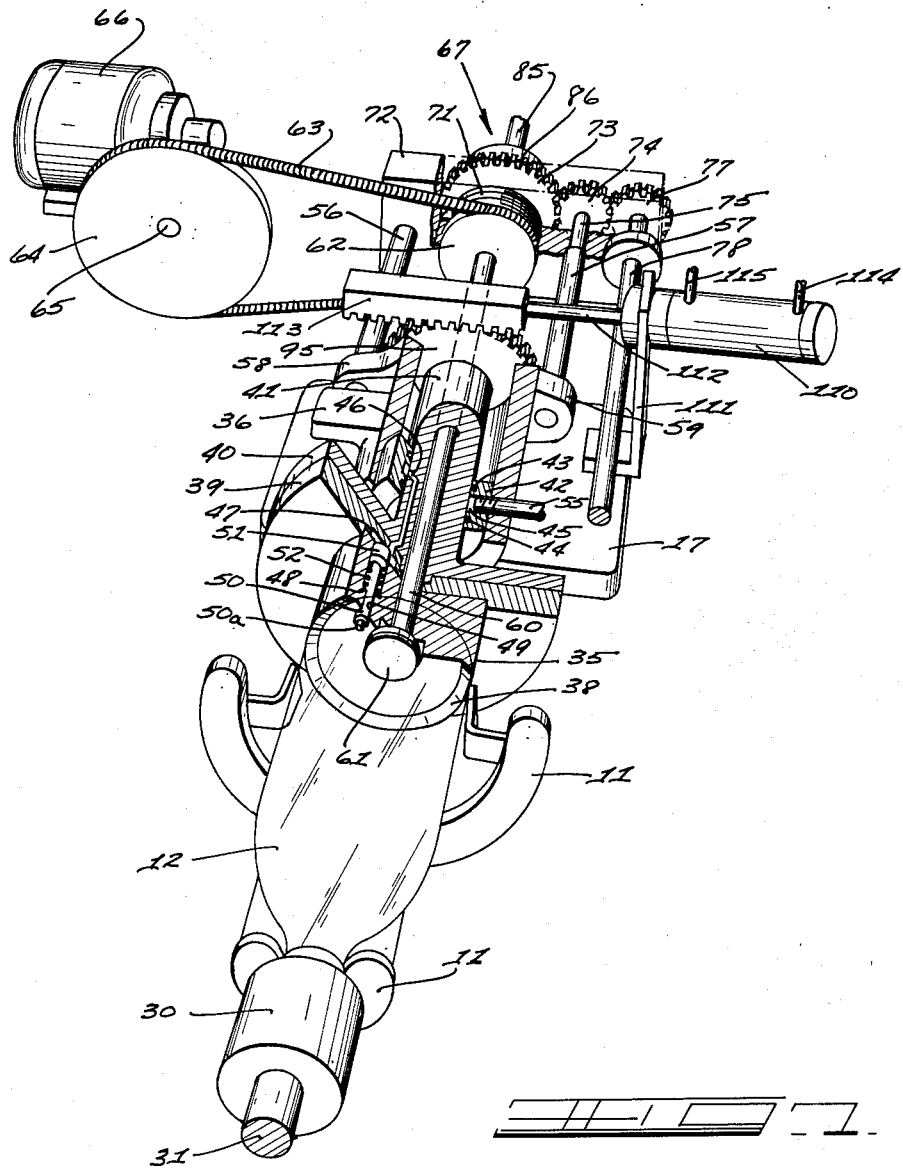
INVENTOR.
John R. Johnson
BY
J. R. Nelson
and W. A. Schaich
ATTORNEYS Sept. 1, 1964 J. R. JOHNSON 3,146,704
DECORATING ON BOTTLES AND THE LIKE
Filed Sept. 26, 1962 9 Sheets-Sheet 6
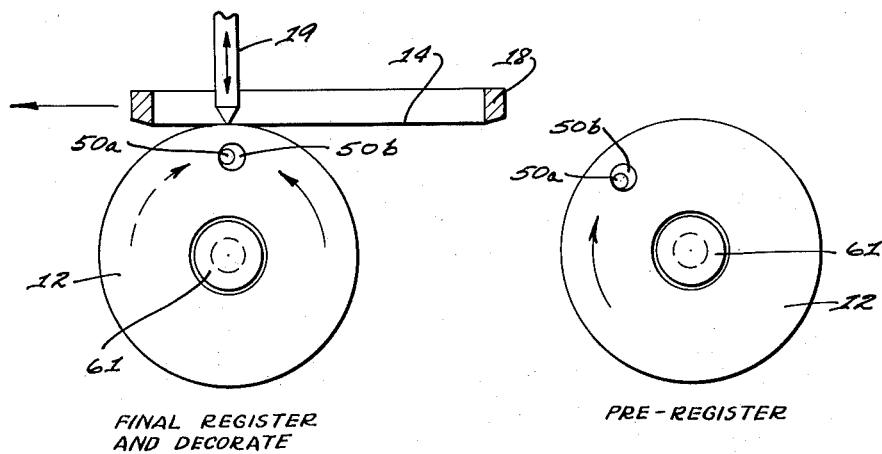
FINAL REGISTER
AND DECORATE
PRE-REGISTER
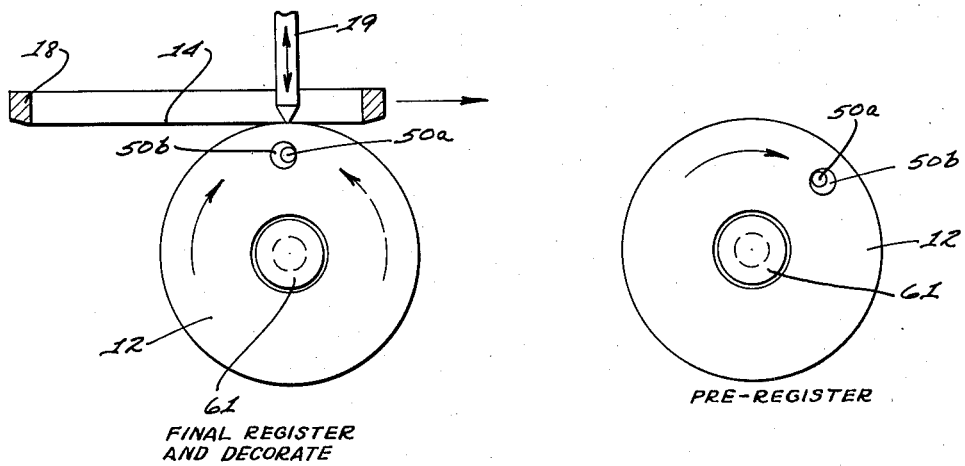
FINAL REGISTER
AND DECORATE
PRE-REGISTER
INVENTOR.
JOHN R. JOHNSON
BY
J. R. Nelson
and W. A. Schaich
ATTORNEYS

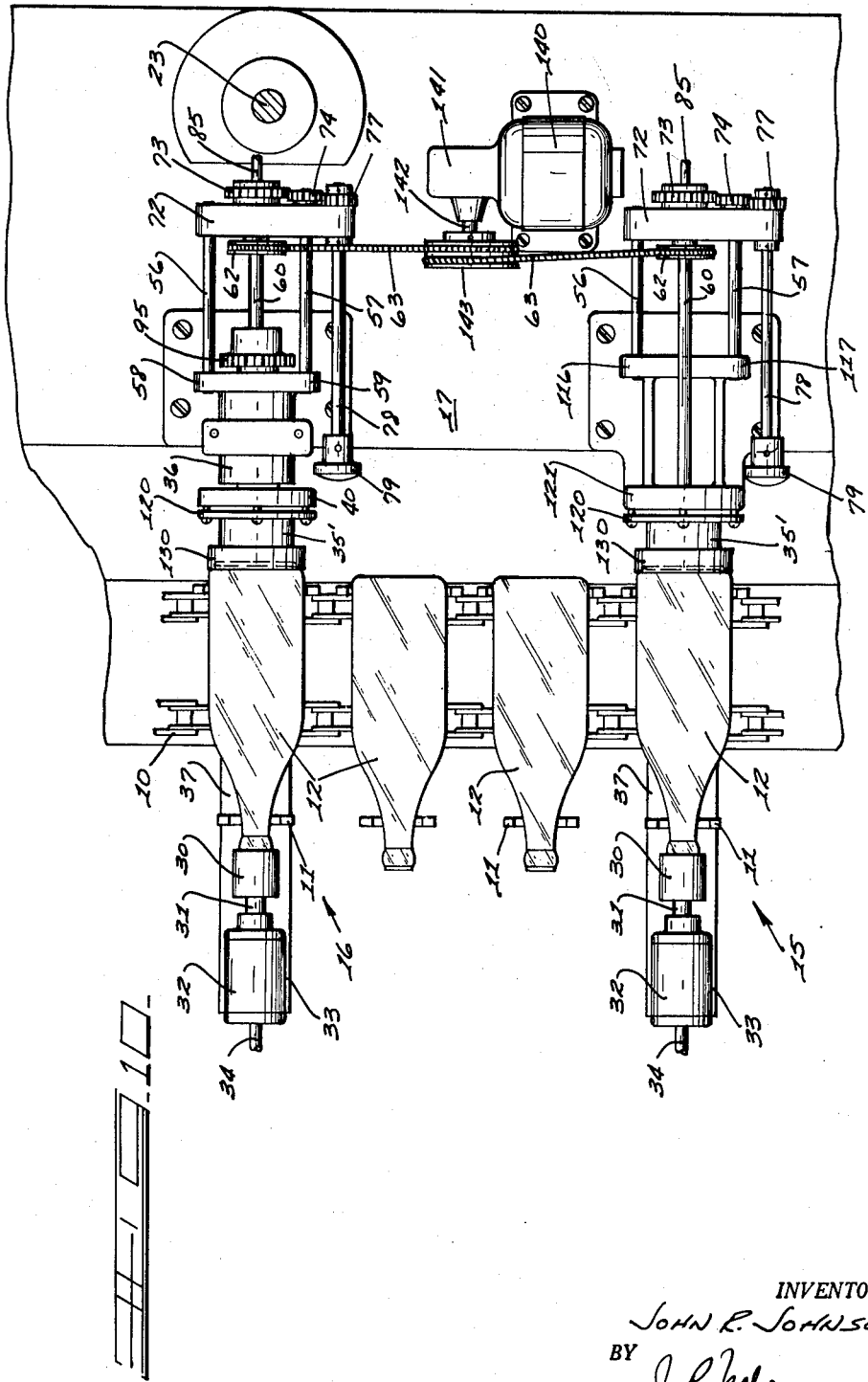

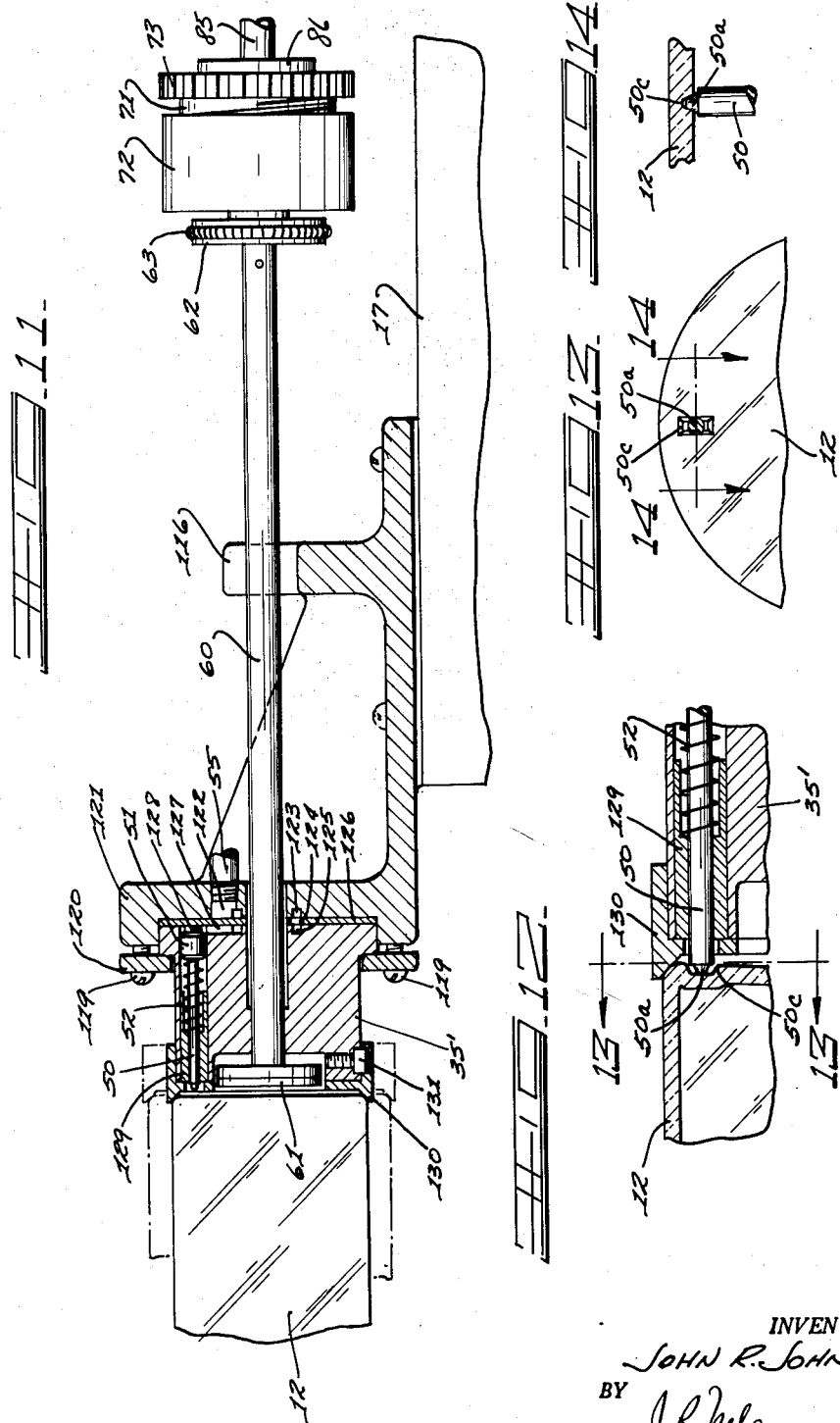

Sept. 1, 1964   J. R. JOHNSON   3,146,704
DECORATING ON BOTTLES AND THE LIKE
Filed Sept. 26, 1962   9 Sheets-Sheet 9
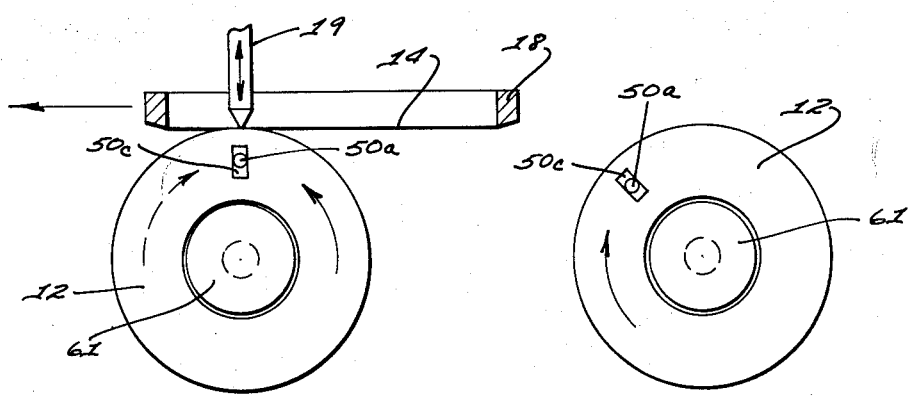
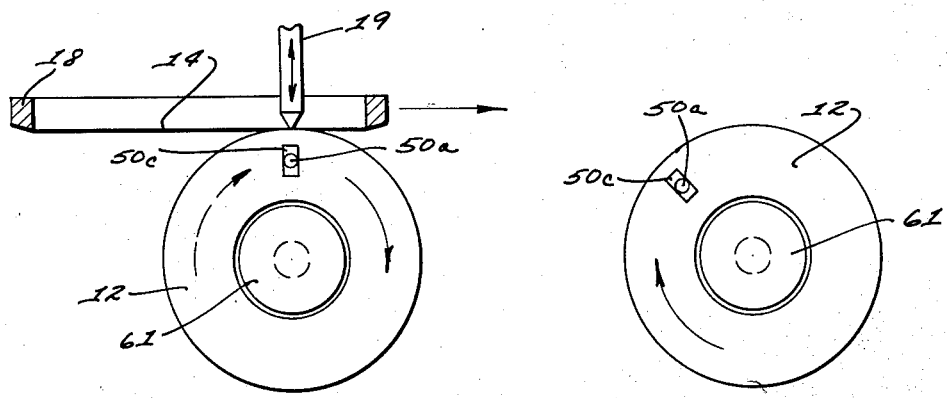
INVENTOR.
JOHN R. JOHNSON
BY
J. R. Nelson
and W. A. Schaich
ATTORNEYS 
United States Patent Office 3,146,704
Patented Sept. 1, 1964

3,146,704
DECORATING ON BOTTLES AND THE LIKE
John R. Johnson, Toledo, Ohio, assignor to Owens-Illinois Glass Company, a corporation of Ohio
Filed Sept. 26, 1962, Ser. No. 226,374
25 Claims. (Cl. 101—126)

The present invention relates to decorating of the exterior surface of bottles, jars, and the like by stencil application of a color composition, such as by a squeegee-screen combination, wherein the design of a decoration is fabricated in the stencil screen and the color composition is applied by a squeegee forcing the color through the screen onto the surface of the bottle. At the time the decoration is applied, the surface area of the bottle to be decorated is in a registered position with respect to the decoration in the screen. The screen and bottle are then driven in synchronism so that the screen is held in a tangential contact on the bottle and in rolling contact so that the design of the decoration is developed onto the round exterior surface of the bottle.

This invention is particularly concerned with the method and apparatus for obtaining rapid and accurate registration of the bottle with respect to a desired surface area to be decorated thereon and the screen.

Prior methods of registration included a registration element or indicia on the side wall of the bottle, as in the early Westlake Patent 1,116,523. Later, in a patent to Cone, 2,132,818, this type indicia was utilized in conjunction with a machine for registering the bottle. The indicia is formed on the bottle at the time it is made in the mold of the glass forming machine and is located at some preselected peripheral location on the surface area of the bottle in relation to the mold seam thereon.

Subsequently, patents to Jackson and Heyne, 2,231,535 and 2,365,961, disclosed a side wall indicia in the form of an indent or recess which is used in conjunction with a finger mechanism to perform registration of the bottles in a decorating cycle on a fully automatic decorating machine.

More recently, in a patent to Vowles, 2,882,818, and in a patent to Dubuit, 2,951,440, the indicia has been located on the bottom wall of the bottle and utilized in conjunction with a registration finger housed in the base chuck of the decorating machine. For example, in the Vowles patent, the registration finger is fixed with respect to the screen and the two are connected by a drive so they move together in synchronism during decorating. A clutch drive is connected to rotate the base chuck, it being freely rotatable with respect to the finger. The base chuck is rotated until the finger engages the recess or slot indicia on the bottle and the clutch then disengages the base chuck. The bottle is then in registered position and held by the engaged finger. The finger and screen are then rotated together and the base chuck merely serves to support and center the bottle. The Dubuit patent represents practically the same system, except for a few detailed changes.

It is an object of this invention to provide an improved method of registration for decoration of bottles, jars and the like, using registration indicia on the bottom wall of the article, and also to provide a simplified and improved mechanism for rotatably adjusting the article preliminary to decorating it.

A significant feature of the invention is the provision in the bottle chuck mechanism of an axially extensible center member that shifts the bottom of bottle free of the base chuck and rotatably supports it between the center member and the head chuck. The center member is free to rotate with respect to the base chuck and a registration finger is radially located in the base chuck to engage the bottom indicia of the bottle during rotation of the latter. The bottle may be driven in this rotation through rotating either the center member or the head chuck, these two elements being the rotatable support for the bottle. As the finger engages the bottle's indicia, the drive therefor slips or becomes inactive and the bottle is stopped on the stationary registration finger. The bottle is then returned to the base chuck by retracting the center member, and the registration finger remains engaged. The base chuck, at the decorating station, is connected with the screen for synchronously rotating the bottle with the screen.

A further important feature of the invention is in the axially shiftable pin or registration finger that is fluid-pressure actuated. In connection with the pin or finger, it is constructed preferably to be frusto-conical or axially tapered, and in one form of the invention herein disclosed, a tapered pin is employed in cooperation with an elongated slot that is radially disposed on the bottom of the bottle. The slot is correspondingly tapered inwardly in the direction of the axis of the bottle to receive the pin in a snug axial fit and, thus, will prevent slippage or play between the pin and the slot and improve the quality or accuracy of the registration of the bottle and the decoration pattern in the screen.

The present invention also presents an improved method of decorating bottles in succession and with a high rapidity of production.

As is the case in the prior machine of Jackson and Heyne, their Patent 2,231,535 discloses a registration device for locating a predetermined surface area of the bottles with the screen. During decorating, the screen is moved longitudinally and in opposite directions. The registration is adjusted so that each article is oriented or rotated to a predetermined position with respect to the decorating screen. The bottles have mold seams or slight ridges that extend lengthwise at opposite sides thereof. It is desired that this orientation be such that the decoration be applied in a predetermined position to (between) these lengthwise seams. Since the decorating screen, at least in one of the prior art machine types, is moved in reciprocating fashion so that decoration is applied to one bottle on an outgoing lengthwise stroke of the screen and a succeeding bottle is decorated on the return lengthwise stroke of the screen, it is important that the registration, at least at the time of decorating, be the same with respect to the screen and the seams of the bottle.

In the method of the present invention, it is therefore an object to provide such positive and accurate control over registration of the decoration by always bringing the registration finger to engage the indicia portion of the bottle at the same side thereof with respect to the direction of rotation of the bottle on the next stroke or movement of the decorating screen. For example, and as will be explained more in detail hereinafter, assume a screen movement in a left-hand direction. The finger will engage the indicia slot on the bottle at its left-hand face. The next bottle to be decorated, as the screen will now be moved in the right-hand direction, should be registered so that the registration finger will engage the right-hand face of the slot on that bottle. This will obviate any slippage or relative movement between the pin and slot or bottle and screen during decorating, because the pin and slot are engaged firmly in the direction for rotation of that bottle in the decorating stroke.

The just-mentioned method of registration will provide accurate decoration on the selected surface of the bottle where it is wanted in applying one or plural decorations on the bottle, and, more significantly, it provides superior registration between plural superimposed decorations needed for multicolor designs. This method will permit the use of a circular, oval or other form of indicia or slot on the bottom of the bottle and will permit the use of a pin or finger of a lesser diameter. This will obtain two advantages in the production of decorated ware; namely, the circular form of slot or recess is less difficult to form or mold in the bottle when the glassware is produced, and greater ease of engagement of the pin in the slot or recess is assured.

Of course, the above features of the invention further include the objective of universal application to permit its use on an automatic decorating machine or on a semiautomatic decorating machine.

A further object of the invention is to provide an improved registration mechanism that may be easily installed on and adapted to use with existing decorating machines, and yet provides such a mechanism that is of simplified construction, easily adaptable to use with different sizes of bottles and is easily maintained.

Other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a plan view of a known decorating machine constructed to include the principles of the present invention;

FIG. 2 is a sectional elevational view taken along line 2—2 on FIG. 1;

FIG. 3 is a partial plan view of such apparatus with parts broken away, which illustrates the pre-registration and final registration mechanism of the invention on an automatic decorating machine;

FIG. 4 is a detailed sectional view of the bottle chuck and registration mechanisms on the machine as the same would be provided at the final registration and decorating station of an automatic decorating machine or as the same would be provided on a semi-automatic decorating machine;

FIG. 5 is a partial and more detailed sectional view of the base chuck mechanism of the invention shown on FIG. 4, and also illustrates the bottle as supported by the extended center member as it is registered and free of the base chuck;

FIG. 6 is a view similar to FIG. 5, which illustrates the bottle after it is registered and returned to the base chuck; and also illustrates the arrangement of the mechanism during the decorating step of the process;

FIG. 7 is a front perspective view of the mechanism of the pre-registration station of the invention;

FIG. 8 is a schematic view showing the method of registration and decoration of the bottle as the decorating screen is operated in a left-hand stroke;

FIG. 9 is a schematic view similar to FIG. 8 showing registration and decoration of the bottle as the decorating screen is next operated in its right-hand stroke;

FIG. 10 is a plan view, partly broken away, similar to FIG. 3, and shows a second embodiment of the invention adapted to an automatic decorating machine;

FIG. 11 is a sectional elevational view showing the pre-registration mechanism of the present invention of the machine of FIG. 10 and illustrates a further embodiment on the chuck mechanism of the invention;

FIG. 12 is a detailed, partial, longitudinal sectional view of a part of FIG. 11;

FIG. 13 is a bottom end view of a bottle, taken along line 13—13 on FIG. 12, showing the radially elongated, tapered slot therein to receive the registration pin;

FIG. 14 is a sectional view of a portion of the bottom wall of the bottle and registration pin, taken along line 14—14 of FIG. 13;

FIG. 15 is a schematic view showing a further embodiment on the method of registration and decoration of the bottle of the invention utilizing the mechanism of FIGS. 10-14, and illustrates the left-hand stroke of the decorating screen; and FIG. 16 is a schematic view similar to FIG. 15 showing registration and decoration of the bottle, and illustrates the right-hand stroke of the decorating screen.

Generally, the invention employs a method and mechanism for registering the seam of a container by a slot or depression in the bottom of the bottle located with a particular relationship to the lengthwise seam in forming the bottle. The registration device includes an axially shiftable pin that will engage in the depression. The pin is used as a means of registration and remains engaged in the slot while driving a bottle in decorating. The pin is housed as a part of the base chuck. The registration pin is shiftable reciprocally in a line parallel to the axis of the bottle and the axis of rotation of the base chuck. In the preferred form of the invention, the pin is extended by fluid pressure and retracted by spring pressure. The pin is projected or extended outwards by fluid pressure to engage the bottom of the bottle prior to rotating the latter for registration. To perform this rotation, the bottle is held on centers between a head or neck chuck and a center pad or member mounted concentrically with the base chuck. The center shaft will unseat the bottle bottom from the base chuck by extension and about this same time the registering pin is extended axially to engage a bearing ring portion at the bottom of the bottle. The registration slot or recess is located in this bearing ring portion of the bottle. The bottle is then rotated past the pin until the pin seats in the bottom recess. Bottle rotation for registration purposes is achieved by a torque limiting drive means connected to the center pad. At the time of decoration of the bottle, the center pad is retracted, but the registration pin remains engaged in the slot. As the center shaft is retracted, the bottle bottom returns to the base chuck and the base chuck and pin are directly connected to the screen carriage drive for synchronously rotating the bottle and linearly moving the decorating screen. The screen and bottle are thus driven in rolling contact for applying the decoration.

On the drawings, the first main embodiment of the invention is shown in connection with an automatic decorating machine of the type disclosed in the Jackson and Heyne Patent 2,231,535. FIG. 1 illustrates a machine conveyor chain 10 which supports and carries plural cradles 11. These cradles in turn support the containers or bottles 12 to be decorated. The cradle conveyor 10 is driven intermittently so that each bottle 12 is advanced step-by-step along the front of the decorating machine 13. Each of the bottles before they reach the decorating screen 14 of the machine are rotated automatically to such a position that proper registration of the screen with the surface of the bottle to be decorated will be obtained, the extent of such rotation being dependent upon the particular rotating position of the article at the time it is deposited on a cradle 11. This automatic rotation first occurs at the pre-registration station 15 on the machine. The mechanism as will be described hereinafter is constructed to provide for at least 360° of rotation of the bottle. After such preliminary registration, the decorating machine advances the bottle to the decorating station 16. The decorating unit at station 16 is mounted on the supporting frame 17 of the machine. The decorating screen 14 is mounted on a screen frame 18 which overlies the bottles 12 at the decorating station. The screen is advanced lengthwise while in contact with the bottle and the bottle is simultaneously rotated by means to be presently described. At the same time, squeegee 19 overlying the screen operates in a conventional manner to force the colorant material through the design on the screen. The screen frame 18 and the mechanism actuating it are supported on a framework comprised of a longitudinal beam 20. The screen frame 18 is carried on arms 21. The horizontal reciprocal movement of the screen frame 18 is controlled by a lower cam track 22. A rock shaft 23 is provided with a rock arm 24 carrying a cam roll 25 running in the cam track 22. At the upper end of the rock shaft 23 is a forwardly extending rock arm 26 which has a driving connection with a slide bar 27. The arm 26 will thus drive the screen carriage 21 back and forth on the guideways of the support beam 20. The brackets 28 holding the screen carrying arms 21 are attached to the slide bar 27 (FIG. 2) mounted to reciprocate horizontally in guideways formed on the lower side of the channel bar 20, which will reciprocate the screen frame 18.

Preliminary to the decorating station, the chuck mechanism and registration device of the present invention are mounted at the pre-registration station 15. As seen on FIG. 1, this comprises a head or neck chuck 30 carried at the outer end of piston rod 31 of the reciprocating fluid-pressure operated motor-cylinder 32. The motor 32 is supported on vertical bracket 33 attached on the horizontal arm 37 rigidly attached to the machine frame. The motor 32 is a spring loaded, single acting cylinder piston assembly that is normally retracted. The neck chuck 30 is engaged with the neck end of a bottle 12 by introduction of pressurized fluid in pipe 34. The pipe 34 is in turn connected to a valve and source of fluid pressure (not shown).

Opposite the neck chuck 30 is a base chuck 35 mounted on end bearings 29 in journal member 36 of the machine frame 17 (FIGS. 2-4). As the bottle 12 arrives at the pre-registration station 15, it is supported in the upright bifurcated members of the cradle 11. The end of the neck chuck 30 is formed with a tapered annular depression that will receive the neck of the bottle. Similarly, the base chuck 35 is provided with a tapered annulus 38 that will receive the bottom of the bottle. In time with machine production, a valve (not shown) is operated in the usual manner to admit pressure fluid in line 34 and operate motor 32. This in turn moves the head chuck 30 to engage the neck end of the bottle 12, lifting the neck along the tapered wall of the recess in the neck chuck, and, simultaneously moves its bottom end against the tapered wall of the annular recess 38 of the base chuck 35. This causes the bottle to be lifted free of the cradle 11 and supported between the end pressure elements comprised of the neck and base chucks.

The base chuck 35, as seen on FIG. 7, is bolted at 39a to a flange 39 that is fastened by cap screws 53 to a similar flange 40. Flange 40 is integral with a hollow bearing sleeve 41 that is rotatably mounted in the bearing gland 42, an attached part of the journal member 36. The gland 42 has sealing rings 43 and 44 between it and the sleeve 41 on opposite sides of the annular groove 45. The sleeve 36 has a lengthwise passage 46 that is in communication with the groove 45 and extends to a stepped chamber 47 formed in the face of flange 39 and closed by the inner face of base chuck 35. Opposite chamber 47 is a cylinder 48 bored axially near the outer radial part of the base chuck. This cylinder 48 is contiguous with a bored guideway 49 for the registration pin or finger 50. Attached on one end of the finger 50 is a piston 51 slidable in the cylinder 48. Ahead of piston 51 is a coil spring 52 that will normally force piston 51 to the back of the cylinder and retract the pin in relation to the base chuck. The registration pin 50 has a tapered tip 50a that is located radially to intercept a slot 50b (see FIGS. 5 and 6) in the bottom of the bottle 12. The registration pin or finger is then mounted for reciprocating movement axially of the base chuck and bottle and is mounted eccentrically with respect to the axis of the chuck and bottle.

Pin 50 is shifted outwardly or extended from base chuck 35 upon the timed admission of pressurized fluid at the pipe inlet 55.

Concentrically mounted in the sleeve member 41 is a center member having a hollow shaft 60. A pad 61 is attached to the outer end of the shaft 60. The other end of shaft 60 has a pulley 62 driveably keyed on it. The pulley 62 receives a torque-limiting drive element shown herein in the form of a coil-spring belt 63 that is reeved in endless fashion around a drive pulley 64. Pulley 64 is rotatably mounted on a shaft 65 of a transmission unit 54 (FIG. 3) that is driveably connected to a motor 66.

Referring briefly to FIG. 4, the shaft 60 of the center member is supported for rotary and axial movement. The center member is connected to a fluid-pressure operated cylinder motor 67 for extending and retracting it with relation to the base chuck and a bottle thereon. The motor includes a sleeve 70 that is shiftable in a rotatable cylinder housing 71 threaded into the bracket 72 attached by the hollow support rods 56 and 57 secured at their ends to the lugs 58 and 59 on the rear end of journal member 36. The cylinder housing 71 has a sprocket 73 provided integrally on the outer end thereof. This sprocket 73, as seen on FIG. 7, is a means of adjusting the stroke of the center pad 61 by meshing engagement with the teeth of the gear 74 on a shaft 75 that is concentrically and rotatably mounted in hollow support rod 57 and support bracket 72. A drive pinion 77 is rotatable with shaft 78 and is in mesh with the teeth of the gear 74. The shaft 78 is rotatably mounted on support bracket 72 and is provided with a hand adjusting knob 79 (FIG. 3). Referring again to FIG. 4, as well as FIG. 7, the rotary movement of knob 79 will drive pinion 77, gear 74 and sprocket 73. As sprocket 73 rotates the cylinder housing 71 of the motor, it will be moved axially with respect to the bracket 72 on the machine. This will adjust the relative position of the center pad 61 in the base chuck 35. The sleeve 70 carries a piston member 80 that is secured by an annular key 81 and an annular flange 82, and piston member 80 includes a ball bearing 83 rotatably supporting the threaded end 60a of the shaft 60. This threaded end carries the pulley 62 and the spring belt 63, and is attached to the piston member 80 by nut 84. Thus, the cylinder sleeve 70 and piston member 80 are shiftable as one piece in one direction by introduction of pressurized fluid in the pipe 85 attached in the cap 86 that is threaded onto the outer end of the cylinder housing 71.

Interposed between the ball bearing 83 and the pulley 62 is a bushing 87 which acts as a spacer to hold the pulley with the shaft 60, 60a, and the parts 62, 87, 83 and 84 are rotatably and linearly movable as a unit. The parts 70 and 80 are merely linearly movable in the cylinder housing 71.

The motor is adjusted, as shown on the drawings, for a reciprocating stroke with relation to the base chuck 35 which permits extension of the center pad 61 with the proper adjustment of the center member 60 to axially unseat the bottle from the base chuck 35. The piston member 80 of the motor is normally held in rearward or retracted position by the spring 88 compressed between the flange 82 and the end of the cylinder housing 71. The center pad 61 is thus extended by fluid pressure and retracted by spring pressure. The sleeve 70 and its attached parts are limited in movement by the clearance at the cap 86 and at the opposite end by the annular wall 89 on the end portion of the cylinder housing 71. This axial movement on shaft 60 need be, for example, about ¼ inch.

In describing the preferred arrangement for operation of both the pin 50 and the center pad 61, other forms of drive means may be utilized, but it has been found advantageous to have both these elements extended under fluid pressure for more rapid and positive action, and, in the event of fluid pressure failure on the machine, these elements will be normally retracted. They could, however, be fluid pressure actuated in both movements, i.e. extension and retraction.

Referring now to FIG. 7, the motor 66 may be operated to continuously or intermittently, as desired, supply torque to the spring belt drive 63 running on pulley 62. This will rotatably drive the center shaft 60 and pad 61. As the bottle is brought into the base chuck 35 and held in the neck chuck 30, the pressure fluid is introduced through line 85 by a suitable timed valve control on the machine. Suitable controls of a type suitable for this purpose are shown in the aforementioned Jackson and Heyne patent, 2,365,961, and need not be further explained in this application, since it would occur to one skilled in this field how to adapt these controls on the machine to time introduction of fluid, for instance to pipe 85, to pipe 55 and to pipe 34. Suffice it to say that the pressure fluid should be applied to pipe 85 which will shift the center pad 61 against the bottom end of bottle 12 and unseat it from the annulus 38 of the base chuck 35. The area of the piston 80 is greater than the area of the piston of the neck chuck motor 32, hence, the neck chuck will yield and allow the bottle to be axially moved out of the base chuck. Almost simultaneously with this, pressure fluid is introduced into pipe 55, which extends the registration finger 50 and engages the bottom of the bottle. The drive at pulley 62 will rotate the center pad 61 and bottle 12 until the depression 50b in the bottom of the bottle and the tip 50a of the finger engage, as shown on FIG. 5. At this time, the engagement of these parts 50a and 50b will cause the spring belt 63 to slip on pulley 62. In this sense, the belt 63 and its motor form a torque-limiting drive means, or, by another means of expression, the belt 63 acts as a slip clutch.

After the bottle has stopped rotation by engagement against the registration pin, the fluid pressure will be released at the pipe 85 and the spring 88 (FIG. 4) will retract the center pad 61 and cause the bottle to shift axially back into engagement with the base chuck, as shown on FIG. 6, with the pin 50 seated in the registration recess 50b of the bottle. Since, at the pre-registration station the base chuck and registration finger are in fixed position, the bottle is registered and returned in this oriented position to the cradle 11 on the machine conveyor. The conveyor next indexes sufficiently to bring the pre-registered bottle to the chuck assembly at the decorating station 16.

Referring again to FIG. 3, the just-described chuck assembly for the pre-registration station 15 will also define the chuck assembly at the final registration and decorating station 16, except for the items to be mentioned presently.

Thus, for the sake of description, reference will be again made to FIGS. 3–6 of the drawings, but this time with reference to the final registration and decorating steps. The neck chuck 30 of the station 16 is engaged with the neck of the bottle by actuation of the cylinder motor 32 and the bottle is lifted and held by its ends in the chucks 30 and 35. A final registration is then performed in the event the bottle has been moved slightly off registration in transferring it from station 15 to station 16. Next, and with rapidity, the fluid pressure is applied at 85 and center pad 61 extended which, as previously described, unseats the bottle from base chuck 35. Almost the same time, fluid pressure is applied to the pipe 55 which extends the registration pin 50 against the bottom of the bottle. Since, the amount of rotation needed to register the bottle at this station is small, a reversing rotary motor 90, such as a reversing "Rotac" Hydromotor, sold by Ex-Cell-O Corporation, Greenville, Ohio, and described in their printed Bulletin 21 A–1256–5M, is employed and is rotatably connected at its drive pulley 91 to the pulley 62 on shaft 60 by a spring belt 63. The motor 90 is supplied with fluid under pressure at either of the motor ports 92 or 93. If fluid is introduced at one of the ports, the other port will provide an exhaust. The motor 90 is reversible and may be set to provide a preselected limited amount of rotation to the center shaft 60 and the bottle, for example, about 45°. As previously described, the rotation will engage the pin 50, 50a in the recess 50b of the bottle and thereafter the spring belt 63 will slip. Next the bottle is returned to the base chuck with the pin engaged, as shown on FIG. 5. The base chuck at its sleeve portion 41 is provided with a drive pinion 95 rotatably attached thereon by set screw 96.

Referring to FIGS. 1 and 2, the arm 26 of the decorating screen drive is connected to positively rotate base chuck 35 and the bottle engaged thereby while the screen travels back and forth during the decorating operation, the peripheral speed of the bottle being the same as the linear speed of the screen. Pivotally mounted on the underside of the arm 26 is a connector block 97 which engages a channel shaped bar 98 attached to a slide bar 99. The latter is mounted to reciprocate lengthwise of the machine in a guideway formed in a stationary support 100. The slide bar 99 is provided on its lower face with a rack 101 that meshes with the pinion 95 and the chuck 35 is rotated concomitantly with the movement of the decorating screen, both being operatively connected to and driven by the rock arm 26.

As the screen is moved in rolling contact relationship with the bottle, the squeegee 19, which is carried on an arm 102, is connected thereto by an adjustable clamp head 103. The arm 102 is mounted by a pivot pin 104 on a supporting bracket 105. The squeegee is held with a yielding pressure against the screen during the decorating movement of the latter. The squeegee is held away from the screen during the registration period and when the bottle is conveyed to and from the decorating station by conventional means, such as a cam (not shown).

In describing one of the methods of the invention for decorating bottles, reference is made to FIGS. 8 and 9. FIG. 8 schematically illustrates the decoration of a first one of the bottles 12. The right hand part of the figure, labelled "pre-register," is the station 15 on FIGS. 1 and 3, and shows the bottle 12 as it is registered by engagement of the pin 50a in the recess 50b in its bottom wall. In registration, the bottle is driven in a clockwise rotation, as shown by the arrow. This will cause the pin 50a to seat against the rearward wall of the recess 50b. The pre-registration is done on this article with the pin 50a located in advance of top dead center by about 45°. The bottle is next transferred to the decorating station 16. Here the registration pin 50a is located at top dead center. Hence, for final registration the bottle will need be turned by at least 45° of rotation. The bottle is again rotated clockwise (the dotted arrow), until the pin 50a seats at the rear side wall of the recess 50b. The registration rotation of the bottle is provided by activating the "Rotac" motor 90 for rotation in this direction. The screen movement is to the left and bottle rotation will thus be in the counterclockwise direction (solid arrow). The decorating movements are provided by the arm 26 and the gear connections, above described.

As shown on FIG. 9, the next bottle 12 will be registered at the pre-register station 15 the same as the previous one, that is the bottle is rotated clockwise, as shown by the arrow, and the pin 50a is seated against the rear side of the recess 50b. However, since the next screen movement will be in the opposite direction, in final registration at the next station (16) the pre-registration pin 50a is shifted to the other side of top dead center by 45° by means which will now be described. This will place the pin in a position so that the bottle is pre-registered in advance of top dead center when it is brought to the decorating station 16. On FIGS. 3 and 7, a cylinder-piston motor 110 is mounted on a bracket support 111 carried on the frame 17. The piston rod 112 of the motor has an end rack 113 that is in mesh with the gear 95 attached to the shaft 41 of the base chuck 35. Fluid pressure is alternately introduced in the end pipes 114 and 115 of the motor cylinder. The stroke of the piston rod is such that the pin 50a will be alternately positioned on either left or right hand side of top dead center. For example, in FIG. 7 the piston rod 112 is fully extended to position the pin 50a in the base chuck at the left hand position comparable to the position it is in on FIG. 8. In FIG. 3, the piston rod 112 is shown retracted which will position the pin 50a at the right hand position comparable to FIG. 9. The controls provided on the machine, as mentioned earlier herein, will include a means for introducing fluid under pressure into lines 115 and 114, alternately, at a time convenient to the cycle for registration of the bottles.

Referring again to FIG. 9, the bottle has been moved from pre-register station 15 to the decorating station 16. At the later station, the bottle is rotated in a counterclockwise direction by motor 90 (see FIG. 3), as shown by the dotted arrow, to bring the pin 50a to seat on the rearmost side of the recess 50b. The bottle is stopped and held in a registered position ready for decorating. The screen 14 is now moved in its right hand stroke and at the same time the bottle rotates clockwise (solid arrow).

The just-described method employs one very significant factor, namely, the registration pin or finger at the decorating station is always seated in the recess of the bottle so that it is in contact with the side of the recess corresponding to the direction for rotation of the bottle during decorating. To put it another way, the bottle is always finally registered ready for decorating by having the pin engaged so that there will be no chance for backlash or slippage of the pin in the recess when the bottle is next driven for decorating.

Another important feature of the above method is the matter of having the pre-registered position slightly rotationally in advance of the registering movement the bottle will undergo at the final registering station. This has the advantage of always assuring proper registration at the decorating station and with a constant, minimum amount of rotation. For example, assume that the registration location at pre-registration was to be top dead center and final registration was selected as the same position, and during transfer from one station to the other the bottle moved so that the recess shifted just slightly in the counterclockwise direction. Then, at the final station for registration, the apparatus would have to assure a full revolution of rotation in the counterclockwise direction, because, as in the example, the recess would be displaced slightly less than 360° of rotation of the bottle from the stationary pin held by the chuck. Thus, in the present method the first registration is intentionally retarded, and a more rapid final registration is assured.

A further embodiment of the invention is shown on FIGS. 10–16. In describing the apparatus of this embodiment, similar or common parts are referred to by the same reference numerals as were used in describing the other embodiment of the invention.

The machine is shown as having a pre-registering station 15 and a decorating station 16. The difference here in the structure resides in the pre-registering mechanism, and the two units are operated by a common rotary drive means for turning the center pads of the chuck assemblies at both stations 15 and 16.

Specifically referring to FIG. 11, the base chuck, referred to generally as 35', is mounted in a fixed position by the annular clip 120 fastening it onto a support member 121 by screws 119. The support member 121 is fastened firmly onto the frame 17 of the machine, and has upright bosses 116 and 117 which attach the motor housing 72 in a fixed position by the rods 56 and 57. Support 121 has the fluid inlet pipe 55 threaded into a passageway 122 that communicates with an annular groove 123. The groove 123 has an opening 124 that connects it to an annular groove 125 located on the opposite side of a disc 126. The groove 125 is connected by the channel 127 to the rear side of the cylinder chamber 128. Cylinder 128 is provided with an end sleeve 129 that holds the spring 52 against the piston 51 of the registration pin 50. The end sleeve 129 is retained in the cylinder by the chuck annulus member 130 that is bolted to the body of the chuck by the cap screw 131. The annulus 130 may thus be easily replaced for a job change when a different size bottle is to be decorated, such as indicated by the phantom outline on FIG. 11.

It should be understood that the just-described base chuck 35' may be substituted for the above described base chuck 35 on the embodiment of FIGS. 4 and 7, and obtain the mentioned quick job change feature.

The embodiment of FIG. 11 includes the center shaft 60 and center pad 61. The shaft 60 has the previously described pulley 62 and spring belt 63 for transmitting rotary movement to the center pad 61. It should be noted the pad 61, as shown on FIG. 11, may be of a larger diameter than shown on FIG. 4; and, thus, the area size of the face of pad 61 may be varied to best suit the bottom surface of the bottle being decorated. The center pad 61 is axially shifted, as previously described, by the motor means within the housing 72 (for details see FIG. 4), and the pad 61 is adjusted axially in its position with relation to the annulus 130 of the chuck 35' by the sprocket 73 and the gear train to the adjusting knob 79 (FIG. 10).

The chuck assembly at the decorating station 16 on FIG. 10 is the same as described earlier for FIG. 3, with the exception of the rotary drive means for the center pad 61. In the present embodiment, this drive for the center shaft 60 and pad 61 of the chucks at stations 15 and 16 is by a common source, such as electric motor 140. The motor has a gear reduction unit 141 with an output shaft 142 drivably mounting a double-grooved pulley 143. The pulley 143 has the two spring belts 63 from each of the registering assemblies of stations 15 and 16 on the machine. On FIG. 10, the pulley 143, for example, is driven in the clockwise direction. Referring to FIGS. 15 and 16, the bottles at each station during registering are rotated in the clockwise direction, as they are driven by the extended center pads 61 at each said station.

In this embodiment, an elongated recess is formed in the bottom of the bottles 12 and has tapered, parallel sides, as the recess 50c shown on FIGS. 12–14. These parallel sides of the recess 50c extend radially on the bottom wall of the bottle 12. The registering pin 50a has a taper at its end which will fit snugly in the tapered recess between the parallel sides when the pin is seated in the recess 50c. Thus, the tendency for any backlash or play between the pin 50a and recess 50c will be obviated, and, accordingly, the method employed in decorating may now be that shown schematically on FIGS. 15 and 16. In FIG. 15, pre-registration is accomplished by rotating the bottle by the extended center pad 61 in a given direction, such as the clockwise direction shown by the solid arrow. The pin 50a is held by the base chuck 35' at a place about 45° of rotation in advance of top dead center. At the decorating station, the final registration is accomplished by again rotating the bottle and center pad clockwise (dotted arrow). Decoration being applied here by movement of the screen 14 in a left-hand stroke, the bottle is rotated counterclockwise (solid arrow) in decorating.

The next bottle, as shown on FIG. 16, will be handled in the same manner in pre-registering it. That is, the pad 61 and bottle will rotate clockwise (solid arrow) to seat pin 50a in recess 50c, the pin 50a being held about 45° in advance of top dead center position. At the decorating station registration is likewise performed by rotating the bottle clockwise (dotted arrow) to engage pin 50a in recess 50c. Decorating is now performed by moving the screen in the right-hand stroke, and, accordingly, the bottle will also be rotated clockwise (solid arrow).

Referring again to FIG. 10, the registration rotations both for pre-registering the bottle at station 15 and finally registering at station 16 are in the same direction (shown as clockwise) and this is performed by the drive motor 140 rotating in one direction. When the bottles register by the pin 50a engaging recess 50c, the spring belts (a torque-limiting device or clutch) 63 slip and the bottle is at rest and returned to the base chuck. The rotation of the bottle with the movement of the screen during decorating is performed, as earlier described, by the rack 101 and engaged pinion 95 which is connected for driving the base chuck 35'.

As a further modification and embodiment of the invention, the principles thereof may be employed on a semi-automatic decorating machine where the pre-registration function is achieved by hand in loading the ware into the machine. In this case, only one chuck mechanism is used on the machine, that being one such as shown on FIG. 4. This chuck asesmbly, of course, may be modified as shown on FIG. 11 for the chuck 35'. In the case of the semi-automatic machine, the steps of operation are there shown and described on FIGS. 4–6 herein. The method employed on such a machine will involve loading the bottle into the chuck 35 and neck chuck 30. The bottle is next shifted axially away from base chuck 35 (FIG. 5) and about the same time the registering finger 50 is extended to contact the bottom wall of the bottle. The bottle is then rotated about its axis on neck chuck 30 and center pad 61 and the base chuck, housing the pin 50 will remain stationary. The pin 50a and recess 50b in the bottle will then engage (as shown on FIG. 5) and stop the bottle in predetermined registered position with respect to the design in the decorating screen. The bottle is then shifted back to the base chuck 35 by withdrawing the center member 60 and pad 61, but the registering finger 50a remains engaged in the bottle recess 50b holding it registered. The base chuck 35 is then driven, as shown in FIG. 6, to rotate the bottle synchronously with the decorating screen, such as by the pinion 95 engaged with the rack 101 of the screen carriage slide 99.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In a decorating machine for screen-squeegee type application of a color decoration on a round article of the class described, the combination of a frame mounting the screen-squeegee mechanism at a decorating station, means for carrying the article into and out of the decorating station, a head chuck, a base chuck, and a means for rotatably registering the article held in said head and base chucks with respect to said screen-squeegee mechanism comprising an axially shiftable center member carried by said base chuck, an axially extensible registering member eccentrically mounted on said base chuck and aligned to engage a registration indica portion of the article located adjacent the base chuck, yieldable means for extending the registering member, means for extending and retracting the center member into and out of engagement with the end of the article supported by the head and base chuck so that the article is shifted axially and free of the base chuck upon extension of said center member, and drive means for rotating the extended center member and thereby rotating the article sufficiently to cause engagement of the registering member and the registration indicia of the article, said drive means including means being responsive to engagement of said registering member and said indicia of the article for stopping the rotation of said center member and the article to present the bottle in a registered position with relation to the screen-squeegee decorating mechanism.

2. The decorating machine combination defined by claim 1, wherein said registering member comprises an axially shiftable pin, and the registration indicia portion of the article comprises a recess in the base of the article.

3. The decorating machine combination defined by claim 2, wherein said recess in the base of the article comprises a radial, parallel-sided slot having said sides tapered inwardly in the direction of the axis of revolution of the article, and said pin being of complementary tapered construction for snug engagement by extension between said two parallel tapered sides of the slot.

4. The decorating machine combination defined by claim 1, wherein the registering member is supported in a cylinder defined by a portion of the base chuck and shiftable therein, and wherein the yieldable means for extending the registering member comprises a means for supplying fluid pressure to said cylinder for extending said registering member into engagement with the article.

5. The decorating machine combination defined by claim 4, wherein the yieldable means also includes a resilient member connected to said registering member in said cylinder normally retracting said registering member therein, the means for supplying fluid pressure to the cylinder for extending the registering member biasing said resilient member.

6. In a stencil decorating machine having a screen adapted to be moved across the surface of an article to be decorated, said article having an index device on the bottom thereof, the improvement comprising an annular base chuck to receive the bottom of said article, a registration finger mounted on the base chuck for reciprocal axial movement, means urging the finger outwardly from the base chuck whereby the bottom of the article engaged in the base chuck is contacted by the finger, a member carried concentrically of the base chuck and engageable with the bottom of the article, means for moving said member into contact with said article in the base chuck for moving the article free of said chuck, drive means, means to connect the drive means for rotating the article with respect to the base chuck to intercept the index device on the bottom of the article by the registration finger, whereby the article is oriented with respect to the screen.

7. In the machine defined by claim 6, the means urging the registration finger outwardly to contact the bottom of the article comprising a fluid-pressure cylinder in said base chuck, the registration finger being connected to a piston member in said cylinder, and means connected to said cylinder for supplying fluid under pressure to said cylinder, whereby said finger is movable by fluid pressure.

8. The machine defined by claim 7, wherein the cylinder is provided with a spring means engaging said piston for normally retracting the registration finger inwardly toward the base chuck, said finger being extended by fluid pressure supplied by said means connected to the cylinder and biasing said spring means.

9. In a decorating machine for decorating articles of revolution by the silk-screen process, a reference positioning device comprising an annular base chuck, a head chuck, the article being initially gripped between said head and base chucks, a registering member shiftably mounted on said base chuck, a center pad concentrically mounted for axial and rotational movement with respect to said base chuck, means connected to said pad for axially shifting it, and torque-limiting drive means connected to said pad for rotating it, the last two means being operated in sequence such that the center pad is axially shifted to grip the article between the head chuck and said pad and move the article free of the base chuck, said pad being rotated to move the article with respect to the registering member and engage the latter, whereby the article is held in registered position against further rotational movement.

10. The method of successively decorating a surface area of articles of revolution by a squeeze-screen decorating apparatus comprising the steps of bringing the articles in succession to a station for registration of the surface area to be decorated and the decoration in the screen, gripping the articles one at a time at a rotational position in an opposed head-base chuck unit, shifting each article axially away from the base chuck of said unit to free it from the base chuck, rotating the article about its axis with respect to the base chuck while holding the latter in a stationary position to engage a registration member on the base chuck with a registration indicia portion of the article, the registration member being held in a predetermined relation with respect to the spatial position of the decorative design in the screen apparatus, thereby stopping the article in a registered position with reference to said decorative design, and moving the article back into engagement with the base chuck, the registration member remaining engaged on said indicia portion of the article, the article thus being in registered position in the head-base chuck unit for decorating.

11. The method of claim 9, wherein said station is a pre-registration station, and the articles are successively thereafter released by said head-base chuck unit to a conveyance and carried successively to a decorating station whereat said screen decorating apparatus is situated, and at said decorating station the articles are each again gripped by a head-base chuck unit, shifted axially free of the base chuck thereof, axially rotated with respect to the stationary base chuck to again engage the registering member thereof and registration indicia of the article thereby stopping the article's rotation in registered position, and moving thereafter back into engagement with the base chuck, the registration finger remaining engaged, the head-base chuck unit thereafter being driven in synchronous rotation with the movement of the screen of the said squeegee-screen decorating apparatus and the decoration applied to the registered surface of the article.

12. The method of claim 11, wherein at least the second-mentioned rotation of the article at the said decorating station is opposite in direction to the last-mentioned rotation of the article during which the decoration is applied.

13. The method of claim 11, wherein the second-mentioned rotation of the article at the decorating station in decorating successive articles is in one direction of rotation, and the last-mentioned rotation of the articles in successively applying decorations thereto is alternately in opposite directions of rotation.

14. The method of claim 13, wherein the first-mentioned rotation of the article at the pre-registration station in registering successive articles is in one direction and the same direction as the subsequent said second-mentioned rotation.

15. Decorating apparatus comprising a head chuck and a base chuck holding an article, an axially, reciprocally, shiftable base center member, means connected to said center member for shifting it to engage the base of the article and grip same between it and the head chuck and move it free of the base chuck, means for rotating the base center member, a contact pin member for engaging the article while the latter is being rotated, a mounting for said pin member and connected to said base chuck, said mounting including a fluid-operated reciprocating motor on said base chuck, said motor comprising a cylinder, a piston and means connected to said cylinder for supplying fluid under pressure to it to reciprocate said piston, said pin member being connected to said piston for moving said pin member toward the article and in engagement with the latter.

16. In a decorating machine including a decorating screen bearing a decoration pattern, a carrier for said screen mounted for rectilinear reciprocating movement, means connected to said carrier for moving it to and fro in decorating articles, and a squeegee device mounted on the machine and adjacent the screen in a stationary position relative to said rectilinear movement of the screen and extending along an axis defining the decorating station, the combination of head and base chuck members each rotatably mounted in opposition along the decorating station and together providing an article chuck, means for engaging said chuck with an article to be rotated, a shaft on said base chuck member, a driving connection between said screen carrier and said shaft, article engaging means concentrically, axially shiftably and rotatably mounted with respect to said shaft, separate drive means connected to said article engaging means for axially moving it into and out of engagement with the article in the base chuck member for respectively disengaging and engaging the article with said base chuck member, rotary drive means connected to said article engaging means and operable for rotating it in response to disengagement of the article and the base chuck member, and automatic means for stopping rotation of said article engaging means at a predetermined rotative position of the article for registration of it with the decoration pattern of said screen, said separate drive means being operated to effect a reengagement of the article and the base chuck member, whereby said means for moving the screen carrier is operated to simultaneously rotate the base chuck member and move the screen in synchronism for decorating the predetermined surface area on the article.

17. An article registering device for use with a squeegee-screen appartus on a decorating machine comprising means to support the article bearing an index recess on one end thereof, said means including head and base chucks for gripping the article by engaging it at its opposite axial ends, a sensing means mounted on said base chuck for contact with said one end of the gripped article, and separate means operable for axially disengaging the gripped article from the base chuck, said means being rotatable for turning the article about its axis and thereby engaging the index recess with the sensing means, whereupon the article is stopped in registered position, the sensing means comprising a registering pin carried by the base chuck and adapted for axial movement for engaging said recess, a fluid-operated, cylinder-piston device mounted on said base chuck, the registering pin being connected to the piston of said device for axial movement thereby, and means supplying fluid under pressure to said cylinder-piston device for axially shifting said registering pin into engagement with said end of the article and into said recess upon the article attaining a registered rotary position during rotation thereof by said separate means.

18. The article registering device defined by claim 17, wherein the means to support the article has a freely rotatable head chuck mounted for axial yielding movement, and wherein said registering pin is normally retracted by the cylinder-piston device and said device is single acting for extending the registering pin under fluid pressure operation toward the said one end of the article.

19. The article registering device of claim 17, included in combination with a decorating screen, a carrier for said screen mounted for rectilinear movement, means connected to said screen for moving it, gear teeth connected with said carriage and moved thereby, and a meshing gear connected with said base chuck for rotating it, said gear connections providing a synchronous drive between the screen and the base chuck.

20. An article registering device for use with a squeegee-screen apparatus on a decorating machine comprising means to support the article bearing an index recess on one end thereof, said means including a freely rotatable head chuck and a base chuck which cooperate for supporting the article by gripping it at its opposite axial ends, a sensing means held stationary at the said one end of the article and in contact with that end of the gripped article, and separate means for rotating the article about its axis for registering the index recess with the sensing means, whereupon the article is stopped in registered position, the sensing means comprising a registering pin adapted for movement to engage said recess, a fluid-operated, cylinder-piston device connected to said registering pin for moving the latter, and means for supplying fluid under pressure to said cylinder for actuating said registering pin, the said separate means comprising a center pad, a shaft mounting said pad, the shaft being rotatably and concentrically mounted with respect to said base chuck, a pulley connected to said shaft, a motor means connected to said shaft for axially shifting the pad into and out of contact with the article, a second motor means, and a torque limiting drive connection between said second motor means and said pulley for rotating said shaft.

21. An article registering device for use with a squeegee-screen apparatus on a decorating machine comprising means to support the article bearing an index recess on one end thereof, said means including a rotatable head chuck and a base chuck for supporting the article by gripping it at its opposite axial ends, a sensing means held stationary at the said one end of the article and in contact with that end of the gripped article, and separate means for rotating the article about its axis for registering the index recess with the sensing means, whereupon the article is stopped in registered position, the sensing means comprising a registering pin adapted for movement to engage said recess, a fluid-operated, cylinder-piston device carried by said base chuck and connected to said registering pin, and means for supplying fluid under pressure to said cylinder-piston device for actuating said registering pin, a reversible motor means, a driven gear on said base chuck for rotating it, a geared drive connection between said motor means and said driven gear, and means for alternately operating the motor means to move the base chuck and registering pin therein between two alternative predetermined registered positions, whereby successive articles are respectively registerable by said registering pin in said alternative positions.

22. The method of decorating an article of revolution comprising rotating the article at a pre-register station to engage a recess portion thereof with a stationary registering finger that is engageable with said recess thereby stopping the article, moving the article to a decorating station whereat said article is to be rotated in a direction of movement with a decorating screen for rolling contact with the latter during decorating, rotating the article at the decorating station, prior to decorating it, in a direction opposite to said direction of decorating to rotation engage the rearward wall of said recess by a second stationary registering finger thereby stopping the article in a final registered position for decorating, moving the decorating screen bearing the decoration and simultaneously rotating the article in said direction of decorating with the second registering finger engaged on said wall of the recess, the decorating screen and article being synchronized in rolling contact, and simultaneously with said movements of the decorating screen and article, stenciling a color decorating material through the decorative design in the screen onto the article surface, the said engagement of said finger on said wall of the recess eliminating backlash or slippage of the registered article during its rotation for applying the decoration thereon.

23. In a stencil decorating method for printing a decoration on the surface of bottles, the decoration being in a screen adapted to move across a bottle to be decorated and the bottles each having a recess in the bottom end thereof, the improvement comprising bringing the bottles seriatim to a pre-registering station, successively rotating each bottle past a stationary registering finger located in a predetermined rotational position until the finger engages the recess thereby stopping the bottle, moving each bottle in succession to a decorating station, again rotating each bottle past a second registering finger held stationary in a predetermined rotational position until the finger engages the recess and said bottle is stopped in a registered position for decoration, moving the screen across each bottle, the screen being moved in opposite directions on successive bottles, and simultaneously rotating each bottle and the said engaged second registering finger in the same direction with the movement of the screen to maintain rolling contact between the screen and each bottle, the second rotation of the succession of said bottles being alternately in opposite directions, each of said successive second rotations of said bottles being in a direction opposite to the final rotation of said bottles during movement of the screen in its said alternate opposite directions, whereby the second registering finger is always in driving engagement with the recess of said bottles in the direction of said last rotation to prevent any slippage between the screen and each of said bottles.

24. The method of claim 23, wherein the first rotations of the said succession of bottles are in the same direction.

25. The method of claim 23, wherein the predetermined rotational position of the second registering finger is maintained in advance of the predetermined rotational position of the first registering finger by shifting the first registering finger between each of the first rotations of successive bottles for engaging it in the bottom end recess thereof so that, with reference to said second rotation of the bottles in said alternate opposite directions, the first registration finger is always retarded a predetermined amount of rotation from the predetermined position of said second registration finger.

References Cited in the file of this patent

UNITED STATES PATENTS

| | | |
|---|---|---|
| 2,132,818 | Cone | Oct. 11, 1938 |
| 2,231,535 | Jackson et al. | Feb. 11, 1941 |
| 2,721,516 | Campbell et al. | Oct. 25, 1955 |
| 2,724,329 | Lucas | Nov. 22, 1955 |
| 2,739,531 | Hagerman | Mar. 27, 1956 |
| 2,882,818 | Vowles | Apr. 21, 1959 |
| 2,951,440 | Dubuit | Sept. 6, 1960 |